(12) United States Patent
Yokota

(10) Patent No.: US 6,386,993 B1
(45) Date of Patent: *May 14, 2002

(54) TWO-PIECE SOLID GOLF BALL

(75) Inventor: Masatoshi Yokota, Akashi (JP)

(73) Assignee: Sumitomo Rubber Industries, Ltd., Hyogo-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/287,364

(22) Filed: Apr. 7, 1999

(30) Foreign Application Priority Data

Apr. 7, 1998 (JP) .......................................... 10-094417

(51) Int. Cl.⁷ .......................... A63B 37/04; A63B 37/06
(52) U.S. Cl. ....................... 473/373; 473/373; 473/374; 473/375; 473/377
(58) Field of Search ................................ 473/373, 374, 473/375, 377

(56) References Cited

U.S. PATENT DOCUMENTS

| 5,403,010 A | | 4/1995 | Yabuki et al. | |
| 5,730,664 A | * | 3/1998 | Asakura | 473/373 |
| 5,803,833 A | * | 9/1998 | Nakamura | 473/377 |
| 5,863,264 A | * | 1/1999 | Yamagishi | 473/377 |
| 5,919,101 A | * | 7/1999 | Yokota | 473/374 |
| 6,004,226 A | * | 12/1999 | Asakura | 473/373 |
| 6,121,357 A | * | 9/2000 | Yokota | 524/406 |
| 6,126,560 A | * | 10/2000 | Maruoka | 473/309 |

FOREIGN PATENT DOCUMENTS

| JP | 698949 | 4/1994 |
| JP | 6154357 | 6/1994 |
| JP | 7194732 | 8/1995 |
| JP | 7289661 | 11/1995 |
| JP | 9239067 | 9/1997 |

* cited by examiner

*Primary Examiner*—Peter Vo
*Assistant Examiner*—Paul D Kim
(74) *Attorney, Agent, or Firm*—Birch, Stewart, Kolasch & Birch, LLP

(57) ABSTRACT

The present invention provides a two-piece solid golf ball having excellent flight performance and good shot feel when hit by a driver, and excellent controllability when hit by an iron club. The present invention relates to a two-piece solid golf comprising a core, and a cover formed on the core, wherein the core has a JIS-C center hardness of not more than 60, a JIS-C surface hardness of 70 to 95, a difference between the center hardness and surface hardness of 20 to 40 and a deformation amount of 2.6 to 3.5 mm when applying from an initial load of 10 kgf to a final load of 130 kgf, and the cover has a Shore D hardness of not more than 60 and a thickness of 1.2 to 2.0 mm.

10 Claims, No Drawings

TWO-PIECE SOLID GOLF BALL

FIELD OF THE INVENTION

The present invention relates to a two-piece solid golf ball. More particularly, it relates to a two-piece solid golf ball having excellent flight performance and good shot feel when hit by a driver, and excellent controllability when hit by an iron club.

BACKGROUND OF THE INVENTION

Many types of golf balls are commercially selling, but two-piece solid golf balls and thread wound golf balls are generally used for round games. The two-piece solid golf ball, when compared with the thread wound golf ball, has better durability and better flight performance because of larger initial velocity when hitting and longer flight distance. The two piece solid golf ball is generally approved of or employed by many golfers, especially amateur golfers. On the other hand, the two-piece solid golf ball has poor shot feel at the time of hitting and poor controllability at approach shot because of spin rate.

In the past, golf balls having good shot feel and controllability have been proposed in, for example, Japanese Patent Kokai Publication No. 98949/1994, Japanese Patent Kokai Publication No. 154357/1994, Japanese Patent Kokai Publication No. 289661/1995, Japanese Patent Kokai Publication No. 194732/1995, Japanese Patent Kokai Publication No. 239607/1997. These golf balls adopt a two-piece structure in which hardness distribution from a center point to a surface of a core is controlled to a proper range, to obtain shot feel and controllability similar to the thread wound golf ball.

For example, Japanese Patent Kokai Publication Nos. 98949/1994 and 154357/1994 suggest a two-piece golf ball in which hardness distribution of the core is controlled so as to increase the hardness in order, a center point, 5 to 10 mm from the center point, 15 mm from the center point and a surface. However, since a cover, which has a flexural modulus of 3,000 to 4,500 kgf/cm$^2$, is hard, shot feel and controllability of the golf ball are poor.

Japanese Patent Kokai Publication No. 289661/1995 suggests a two-piece golf ball, of which a core has a JIS-C surface hardness of 55 to 75, a JIS-C hardness of cross section other than the surface of 65 to 85 and a variance of hardness over the cross section of not more than 5. The surface hardness is smaller than the hardness of the cross section by not less than 5. However, since the surface of the core is soft in the golf ball, shot feel is poor.

Japanese Patent Kokai Publication No. 194782/1995 suggests a two-piece golf ball, of which a core has a JIS-C center hardness of 40 to 57, a JIS-C surface hardness of 70 to 95, and difference between the center hardness and the surface hardness of 20 to 40. However, since the cover, which has a thickness of 1.4 to 2.7 mm, is thick and hard in the golf ball, shot feel and controllability are poor.

Japanese Patent Kokai Publication No. 239067/1997 suggests a two-piece golf ball, of which a core has a JIS-C surface hardness of not more than 85, and hardness distribution that a center hardness is smaller w than the surface hardness by 8 to 20 and a hardness at the portion of not more than 5 mm from the surface is smaller than the surface hardness by not more than 8. However, since the difference between the center hardness and the surface hardness is small in the golf ball, shot feel is poor, and fight performance is not sufficient.

It is required to solve the above problem and provide a two-piece golf ball having better flight performance, better shot feel and better controllability. Therefore, it is required to improve such physical properties further.

OBJECTS OF THE INVENTION

A main object of the present invention is to provide a two-piece solid golf ball having excellent flight performance and good shot feel when hit by a driver, and excellent controllability when hit by an iron club.

According to the present invention, the object described above has been accomplished by adjusting a center hardness, surface hardness, a difference between the center hardness and the surface hardness and a deformation amount when applying from an initial load of 10 kgf to a final load of 130 kgf of the core, and a hardness and thickness of the cover to a specified range, thereby providing a two-piece solid golf ball having excellent flight performance and good shot feel when hit by a driver, and excellent controllability when hit by an iron club.

SUMMARY OF THE INVENTION

The present invention provides a two-piece solid golf ball comprising a core, and a cover formed on the core, wherein the core has a JIS-C center hardness of not more than 60, a JIS-C surface hardness of 70 to 95, a difference between the center hardness and surface hardness of 20 to 40 and a deformation amount of 2.6 to 3.5 mm when applying from an initial load of 10 kgf to a final load of 130 kgf, and the cover has a Shore D hardness of not more than 60 and a thickness of 1.2 to 2.0 mm.

DETAILED DESCRIPTION OF THE INVENTION

The two-piece solid golf ball of the present invention comprises a core, and a cover formed on the core. The core is obtained by press molding and vulcanizing a rubber composition using a method and condition which have been conventionally used for preparing the core of solid golf balls. The rubber composition contains a base rubber, a co-crosslinking agent, an organic peroxide, and optionally an organic sulfide compound, a filler, an antioxidant and the like.

The base rubber used for the core of the present invention may be natural rubber and/or synthetic rubber, which has been conventionally used for solid golf balls. Preferred is high-cis polybutadiene rubber containing not less than 40%, preferably not less than 80% of a cis-1, 4 bond. The high-cis polybutadiene rubber may be mixed with natural rubber, polyisoprene rubber, styrene-butadiene rubber, ethylene-propylene-diene rubber. (EPDM) and the like.

The co-crosslinking agent can be a metal salt of α, β-unsaturated carboxylic acid, including mono or divalent metal salts, such as zinc or magnesium salts of α,β-unsaturated carboxylic acids having 3 to 8 carbon atoms (e.g. acrylic acid, methacrylic acid, etc.). Preferred co-crosslinking agent is zinc diacrylate because it imparts high rebound characteristics to the resulting golf ball. An amount of the metal salt of the unsaturated carboxylic acid in the rubber composition may be from 20 to 40 parts by weight, preferably from 22 to 38 parts by weight, based on 100 parts by weight of the base rubber. When the amount of the metal salt of the unsaturated carboxylic acid is smaller than 20 parts by weight, the core is too soft, and rebound characteristics are degraded to reduce flight distance. On the other hand, when the amount of the metal salt of the unsaturated carboxylic acid is larger than 40 parts by weight, the core is too hard, and shot feel is poor.

The organic peroxide includes, for example, dicumyl peroxide, 1,1-bis(t-butylperoxy)-3,3,5-trimethylcyclohexane, 2,5-dimethyl-2,5-di(t-butylperoxy) hexane, di-t-butyl peroxide and the like. Preferred organic peroxide is dicumyl peroxide. An amount of the organic peroxide may be from 0.3 to 5.0 parts by weight, preferably 0.5 to 3.0 parts by weight, based on 100 parts by weight of the base rubber. When the amount of the organic peroxide is smaller than 0.3 parts by weight, the core is too soft and rebound characteristics are degraded to reduce flight distance. On the other hand, when the amount of the organic peroxide is larger than 5.0 parts by weight, the core is too hard, and shot feel is poor.

The rubber composition for the core of the golf ball of the present invention may optionally contain an organic sulfide compound in addition to the above components. The organic sulfide compound includes polysulfides having 2 to 4 sulfur atoms, such as diphenyl polysulfide, dibenzyl polysulfide, dibenzoyl polysulfide, dibenzothiazoyl polysulfide, dithiobenzoyl polysulfide and the like. Preferred organic sulfide compound is diphenyl disulfide, in view of rebound characteristics. An amount of the organic sulfide compound may be from 0.1 to 3.0 parts by weight, preferably from 0.3 to 2.0 parts by weight, based on 100 parts by weight of the base rubber. When the amount of the organic sulfide compound is smaller than 0.1 parts by weight, the technical effects of the organic sulfide compound do not sufficiently exhibit. On the other hand, when the amount of the organic sulfide compound is larger than 3.0 parts by weight, the technical effects are not improved more. By using the organic sulfide compound in the rubber composition for the core, the crosslinkage of the rubber by co-crosslinking agent shows high density, and thus rebound characteristics are improved.

The rubber composition for the core of the golf ball of the present invention can contain other components, which have been conventionally used for preparing the core of solid golf balls, such as inorganic filler (such as zinc oxide, barium sulfate, calcium carbonate and the like), high specific gravity metal powder filler (such as tungsten powder, molybdenum powder and the like), antioxidant or peptizing agent. If used, an amount of the antioxidant is preferably 0.2 to 0.5parts by weight, based on 100 parts by weight of the base rubber.

The core is obtained by mixing the above rubber composition, and vulcanizing and press-molding it in a mold. The core of the golf ball of the present invention has a JIS-C center hardness of not more than 60, preferably 40 to 60 more preferably 50 to 59. When the center hardness of the core is more than 60, shot feel is hard and poor. The core of the golf ball of the present invention has a JIS-C surface hardness of 70 to 95, preferably 75 to 90, more preferably 78 to 87. When the surface hardness of the core is smaller than 70, rebound characteristics are degraded. On the other hand, when the surface hardness of the core is larger than 95, shot feel is hard and poor. The center hardness of the core is smaller than the surface hardness of the core, and the difference between the center hardness and surface hardness is 20 to 40, preferably 20 to 35, more preferably 20 to 30. When the difference is smaller than 20, launch angle is small to reduce flight distance. On the other hand, when the difference is larger than 40, shot feel is little and poor. The term "a center hardness of a core" as used herein refers to the hardness, which is obtained by cutting the core into two equal parts and then measuring a hardness at center point.

The core of the golf ball of the present invention has a deformation amount of 2.6 to 3.5 mm, preferably 2.8 to 3.4 mm when applying from an initial load of 10 kgf to a final load of 130 kgf on the core. When the deformation amount is smaller than 2.6 mm, the core is too hard and the shot feel of the resulting golf ball is poor. On the other hand, when the deformation amount is larger than 3.5 mm, the core is too soft and rebound characteristics are degraded to reduce flight distance.

Molding the core within the ranges described above can be conducted by adjusting the vulcanization condition. That is, it can be conducted by setting the vulcanization condition so that the degree of the vulcanization peaks from 5 to 20 minutes later, if the vulcanization is initiated at the time of clamping. The core having the above hardness and deformation amount can be typically obtained by vulcanizing and press-molding the rubber composition at 130 to 180° C. for 10 to 40 minutes. The core of the golf ball of the present invention has a diameter of 38.0 to 41.0 mm, preferably 38.5 to 40.5 mm. When the diameter of the core is smaller than 38.0 mm, the cover is too thick. Therefore, the technical effects of he core, such as rebound characteristics and the like, do not sufficiently exhibit. On the other hand, when the diameter is larger than 41.0 mm, the cover is too thin, and cut resistance is poor. A cover is then covered on the core.

The cover of the golf ball of the present invention has a Shore D hardness of not more than 60, preferably 50 to 60, more preferably 52 to 59. When the Shore D hardness is larger than 60, shot feel is hard and poor, and controllability at approach shot is poor. The cover has a thickness of 1.2 to 2.0 mm, preferably 1.3 to 1.9 mm. When the thickness is smaller than 1.2 mm, cut resistance is poor. On the other hand, the thickness is larger than 2.0 mm, rebound characteristics are degraded to reduce flight distance.

The material used for the cover of the present invention is not limited, as long as the above physical properties are imparted to it, but the material which has been conventionally used for solid golf ball cover can be used. Preferred material is thermoplastic resin. Examples of thermoplastic resins include ionomer resin, polyethylene resin, polyurethane resin, 1,2-polybutadiene, styrene-butadiene copolymer and the like, or the mixture thereof. The ionomer resin used in the present invention includes ethylene-(meth) acrylic acid copolymer, of which a portion of carboxylic acid groups is neutralized with metal ion. The metal ion which neutralizes a portion of carboxylic acid groups of the copolymer includes alkaline metal ion, such as sodium ion, potassium ion, lithium ion and the like; divalent metal ion, such as zinc ion, calcium ion, magnesium ion and the like; trivalent metal ion, such as aluminum ion, neodymium ion and the like; and the mixture thereof. Preferred are sodium ion, zinc ion, lithium ion and the like, in view of rebound characteristics, durability and the like. The ionomer resin is not limited, but examples thereof will be shown by a trade name thereof. Examples of the ionomer resin, which is commercially available from Mitsui Du Pont Polychemical Co., Ltd., include Hi-milan 1555, Hi-milan 1557, Hi-milan 1605, Hi-milan 1652 Hi-milan 1705, Hi-milan 1706, Hi-milan 1707, Hi-milan 1855 Hi-milan 1856 and the like. Examples of the ionomer resin, which is commercially available from Du Pont U.S.A., include Surlyn AM7317, Surlyn AM7318, Surlyn 8320 and the like. Examples of the ionomer resin, which is commercially available from Exxon Chemical Co., include Iotek 7010, Iotek 8000 and the like. Examples of polyethylene resins include UJ960, which is commercially available from Mitsubishi Chemical Co., Ltd. and the like. Examples of polyamide resins include Diamide E40-S3, E47-S3, and E55-S3, which are commercially available from Daicel Hulls Co., Ltd., and Pebax 5533SN00, 4033SN00 and 2533SN00, which are commercially available from Atochem Co. and the like. Examples of polyurethane include Elastoran ET880 and ET890, which are commercially available from Takeda Verdishe Co., Ltd., Pandex T-8180, which is commercially available from Dainippon Ink Chemical Co., Ltd. and the like.

The cover used in the present invention may optionally contain fillers (such as barium sulfate, calcium carbonate, etc.), coloring agents (such as titanium dioxide, etc.), and the other additives such as a dispersant, an antioxidant, a UV absorber, a photostabilizer and a fluorescent agent or a fluorescent brightener, etc., in addition to the resin component, as long as the addition of the additives does not deteriorate the desired performance of the golf ball cover. An amount of the pigment is preferably 0.1 to 5 parts by weight, based on 100 parts by weight of the resin component for the cover.

A method of covering the core with the cover is not specifically limited, but may be a well-known method, which has been conventionally used for forming golf ball cover. For example, there can be used a method comprising molding the cover composition into a semi-spherical half-shell in advance, covering the solid core with the two half-shells, followed by pressure molding, or a method comprising injection molding the cover composition directly on the core to cover it. At the time of cover molding, many depressions called "dimples" may be optionally formed on the surface of the golf ball. Furthermore, paint finishing or marking stamp may be optionally provided after cover molding for serving commercial sell. The two-piece solid golf ball of the present invention is formed, so that it has a diameter of not less than 42.67 mm and a weight of not more than 45.93 g, according to the PGA rule.

EXAMPLES

The following Examples and Comparative Examples further illustrate the present invention in detail but are not to be construed to limit the scope of the present invention.

Examples 1 to 5 and Comparative Examples 1 to 5

Production of core

The rubber compositions for the core shown in Table 1 (Example)) and Table 2 (Comparative Example) were mixed with a mixing roll, and then vulcanized by press-molding at the vulcanization condition shown in the same Table to obtain spherical cores. The diameter, hardness distribution and deformation amount of the resulting core were measured. The results are shown in Table 4 (Example) and Table 2 (Comparative Example). The test methods are described later.

TABLE 1

| | | | | | (parts by weight) |
|---|---|---|---|---|---|
| | Example No. | | | | |
| Core composition | 1 | 2 | 3 | 4 | 5 |
| BR18 *1 | 100 | 100 | 100 | 100 | 100 |
| Zinc diacrylate | 30 | 33 | 36 | 33 | 33 |
| Zinc oxide | 15.2 | 14.1 | 13.0 | 17.2 | 11.5 |
| Antioxidant *2 | 0.5 | 0.5 | 0.5 | 0.5 | 0.5 |
| Dicumyl peroxide | 2.0 | 2.0 | 2.0 | 2.0 | 2.0 |

TABLE 1-continued

| | | | | | (parts by weight) |
|---|---|---|---|---|---|
| | Example No. | | | | |
| Core composition | 1 | 2 | 3 | 4 | 5 |
| Diphenyl disulfide | 0.5 | 0.5 | 0.5 | 0.5 | 0.5 |
| Vulcanization condition | *a | *a | *a | *a | *a |

TABLE 2

| | | | | | (parts by weight) |
|---|---|---|---|---|---|
| | Comparative Example No. | | | | |
| Core composition | 1 | 2 | 3 | 4 | 5 |
| BR18 *1 | 100 | 100 | 100 | 100 | 100 |
| Zinc diacrylate | 24 | 30 | 36 | 33 | 33 |
| Zinc oxide | 17.5 | 15.2 | 13.0 | 14.1 | 18.7 |
| Antioxidant *2 | 0.5 | 0.5 | 0.5 | 0.5 | 0.5 |
| Dicumyl peroxide | 2.0 | 2.0 | 2.0 | 2.0 | 2.0 |
| Diphenyl disulfide | 0.5 | 0.5 | 0.5 | 0.5 | 0.5 |
| Vulcanization condition | *a | *b | *b | *a | *a |

*1: High-cis Polybutadiene rubber (trade name "BR18") available from JSR Co., Ltd.
*2: Antioxidant (trade name "Yoshinox 425") from Yoshitomi Pharmaceutical Ind., Ltd.
(Vulcanization condition)
*a: at 170° C. for 20 minutes
*b: at 150° C. for 35 minutes Preparation of cover compositions The formulation materials shown in Table 3 were mixed using a kneading type twin-screw extruder to obtain pelletized cover compositions. The extrusion condition was, a screw diameter of 45 mm, a screw speed of 200 rpm, and a screw L/D of 35.

The formulation materials were heated at 200 to 260° C. at the die position of the extruder. The Shore D hardness of the resulting cover compositions were shown in Table 4 and Table 5. The test methods are described later.

TABLE 3

| | | (parts by weight) |
|---|---|---|
| Cover composition | A | B |
| Hi-milan 1555 *3 | 5 | — |
| Hi-milan 1605 *4 | — | 50 |
| Hi-milan 1706 *5 | — | 50 |
| Hi-milan 1855 *6 | 95 | — |
| Titanium dioxide | 2 | 2 |
| Barium sulfate | 2 | 2 |

*3: Hi-milan 1555 (trade name), ethylene-methacrylic acid copolymer ionomer resin obtained by neutralizing with sodium ion, manufactured by Mitsui DuPont Polychemical Co., Ltd.
*4: Hi-milan 1605 (trade name), ethylene-methacrylic acid copolymer ionomer resin obtained by neutralizing with sodium ion, manufactured by Mitsui DuPont Polychemical Co., Ltd.
*5: Hi-milan 1706 (trade name), ethylene-methacrylic acid copolymer ionomer resin obtained by neutralizing with zinc ion, manufactured by Mitsui DuPont Polychemical Co., Ltd.
*6: Hi-milan 1855 (trade name), ethylene-methacrylic acid-isobutyl acrylate terpolymer ionomer resin obtained by neutralizing with zinc ion, manufactured by Mitsui DuPont Polychemical Co., Ltd.

Production of golf ball

The cover compositions shown in Table 4 (Example) and Table 5 (Comparative Example) were covered on the resulting core by injection molding. Then, deflashing, surface pretreatment for painting, paint and the like, which are generally done on the surface of a golf ball, were conducted on the surface to produce a golf ball having a weight of 45.4 g and a diameter of 42.7 mm. With respect to the resulting golf balls, deformation amount, flight distance, spin amount (when hit by a sand wedge), shot feel at the time of hitting (by a driver) and controllability at approach shot (by a sand wedge) were measured or evaluated. The results are shown in Table 4 (Example) and Table 5 (Comparative Example). The test methods are as follows.

(Test method)

(1) Deformation amount

The deformation amount was determined by applying an initial load of 10 kg to a final load of 130 kg on the core or golf ball.

(2) Shore D hardness of cover

The Shore D hardness was determined according to ASTM D-2240, using a sample of a stack of the three or more sheets which were obtained by heat and press molding the each cover composition into a sheet having a thickness of about 2 mm and storing at 23° C. for 2 weeks.

(3) Flight distance

A No. 1 wood club (a driver) was mounted to a swing robot manufactured by True Temper Co. and the resulting golf ball was hit at a head speed of 45 m/second, flight distance to the firstly dropping point on the ground (carry) was measured.

(4) Shot feel and controllability

The shot feel of the golf ball is evaluated by 10 professional golfers according to a practical hitting test using a driver (a No. 1 wood club). The controllability of the golf ball is evaluated by 10 professional golfers according to a practical hitting test at 30 yards approach shot using a sand wedge. The evaluation criteria are as follows.

(Evaluation criteria):

○: Not less than 8 out of 10 golfers felt that the golf ball has good shot feel and good controllability.

Δ: From 4 to 7 out of 10 golfers felt that the golf ball has good shot feel and good controllability.

X: Not more than 3 out of 10 golfers felt that the golf ball has good shot feel and good controllability.

TABLE 4

| Test item | Example No. | | | | |
|---|---|---|---|---|---|
| | 1 | 2 | 3 | 4 | 5 |
| (Core) | | | | | |
| Diameter (mm) | 39.6 | 39.6 | 39.6 | 39.0 | 40.2 |
| JIS-C hardness | | | | | |
| Center point (a) | 57 | 58 | 59 | 58 | 57 |
| Surface (b) | 81 | 83 | 85 | 80 | 85 |
| Difference (b) − (a) | 24 | 25 | 26 | 22 | 28 |
| Deformation amount (mm) | 3.4 | 3.1 | 2.8 | 3.0 | 3.2 |
| (Cover) | | | | | |
| Composition | A | A | A | A | A |
| Shore D hardness | 58 | 58 | 58 | 58 | 58 |
| Thickness (mm) | 1.6 | 1.6 | 1.6 | 1.9 | 1.3 |
| (Ball) | | | | | |
| Deformation amount (mm) | 3.2 | 2.9 | 2.6 | 2.7 | 3.1 |
| Carry (yard) | 253 | 254 | 256 | 253 | 256 |
| Spin amount (rpm) | 6880 | 6950 | 7020 | 6910 | 6960 |
| Shot feel | ○ | ○ | ○ | ○ | ○ |
| Controllability | ○ | ○ | ○ | ○ | ○ |

TABLE 5

| Test item | Comparative Example No. | | | | |
|---|---|---|---|---|---|
| | 1 | 2 | 3 | 4 | 5 |
| (Core) | | | | | |
| Diameter (mm) | 39.6 | 39.6 | 39.6 | 39.6 | 38.2 |
| JIS-C hardness | | | | | |
| Center point (a) | 55 | 68 | 72 | 58 | 62 |
| Surface (b) | 79 | 76 | 81 | 83 | 80 |
| Difference (b) − (a) | 24 | 8 | 9 | 25 | 18 |
| Deformation amount (mm) | 4.2 | 3.3 | 2.5 | 3.1 | 2.9 |
| Cover) | | | | | |
| Composition | A | A | A | B | A |
| Shore D hardness | 58 | 58 | 58 | 69 | 58 |
| Thickness (mm) | 1.6 | 1.6 | 1.6 | 1.6 | 2.3 |
| (Ball) | | | | | |
| Deformation amount (mm) | 3.8 | 3.1 | 2.3 | 2.7 | 2.5 |
| Carry (yard) | 248 | 252 | 251 | 254 | 250 |
| Spin. amount (rpm) | 6640 | 6890 | 7010 | 6950 | 6810 |
| Shot feel | X | X | X | X | X |
| Controllability | X | Δ | Δ | X | Δ |

As is apparent from the comparison of the physical properties of the golf balls of Examples 1 to 5 shown in. Table 4 with. those of the golf balls of Comparative Examples 1 to 5 shown in Table 5, the golf ball of the present invention of Examples. 1 to 6 have better shot feel and controllability than the golf ball of Comparative Examples 1 to 5, while keeping excellent flight distance.

On the other hand, the golf ball of Comparative Example 1 has larger deformation amount of the core, and thus the core is too soft. Therefore, rebound characteristics are degraded to reduce flight distance, and shot feel and controllability are poor. The golf ball of Comparative Examples 2 has higher center hardness of the core, and thus shot feel of the resulting golf ball is poor; difference between center hardness and surface hardness of the core is smaller, and thus launch angle of the resulting golf ball is small to reduce flight distance.

The golf ball of Comparative Example 3 has higher center hardness of the core, and thus shot feel of the resulting golf ball is poor. The golf ball has smaller difference between center hardness and surface hardness of the core, and thus launch angle of the resulting golf ball is small to reduce flight distance. The golf ball has larger deformation amount of the core, and thus the core is too hard and the shot feel of the resulting golf ball is poor.

The golf ball of Comparative Example 4 has larger cover hardness, and thus shot feel of the resulting golf ball is hard and poor, and controllability is poor. The golf ball of the Comparative Example 5 has higher center hardness of the core, and thus shot feel of the resulting golf ball is poor. The golf ball has smaller difference between center hardness and surface hardness of the core, and thus launch angle of the resulting golf ball is small to reduce flight distance. The golf ball has larger thickness of the cover, and thus rebound characteristics of the resulting golf ball are degraded to reduce flight distance, and shot feel and controllability are poor.

What is claimed is:

1. A two-piece golf ball, comprising:

a core, said core is formed from a rubber composition comprising:

20 to 40 parts by weight of a co-crosslinking agent,
0.5 to 3.0 parts by weight of an organic peroxide, and
0.1 to 5.0 parts by weight of an organic sulfide compound, based on 100 parts by weight of cis-1,4-polybutadiene containing not less than 40% of cis-1,4 bond content as a base rubber; and a cover formed on the core, wherein the core has a diameter of 38.5 to 40.5 mm, a JIS-C center hardness of not more than 60, a JIS-C surface hardness of 70 to 95, a difference between the center hardness and the surface of 20 to 40 and a deformation amount of 2.8 to 3.4 mm when applying from an initial load of 10 kgf to a final load of 130 kgf, and the cover has a Shore D hardness of not more than 60 and a thickness of 1.2 to 2.0 mm.

2. The two-piece solid golf ball according to claim 1, wherein the cover is formed from ionomer resin, polyolefin resin, polyamide resin, polyurethane resin, 1,2-polybutadiene, styrene-butadiene copolymer, or the mixture thereof.

3. The two-piece golf ball according to claim 1, wherein said co-crosslinking agent is a metal salt of an α,β-unsaturated carboxylic acid.

4. The two-piece golf ball according to claim 1, wherein said co-crosslinking agent is a zinc or magnesium salt of an α,β-unsaturated carboxylic acid having 3 to 8 carbon atoms.

5. The two-piece golf ball according to claim 1, wherein said co-crosslinking agent is zinc diacrylate.

6. The two-piece golf ball according to claim 1, wherein said organic peroxide is dicumyl peroxide, 1,1-bis(t-butylperoxy)-3,3,5-trimethylcyclohexane, 2,5-dimethyl-2,5-di(t-butylperoxy) hexane or di-t-butylperoxide.

7. The two-piece golf ball according to claim 1, wherein said organic peroxide is dicumyl peroxide.

8. The two-piece golf ball according to claim 1, wherein said organic sulfide compound is a polysulfide having 2 to 4 sulfur atoms.

9. The two-piece golf ball according to claim 1, wherein said organic sulfide compound is diphenyl polysulfide, dibenzyl polysulfide, dibenzoyl polysulfide, dibenzothiazoyl polysulfide or dithiobenzoyl polysulfide.

10. The two-piece golf ball according to claim 1, wherein said organic sulfide compound is diphenyl disulfide.

* * * * *